(12) United States Patent
Adamson, III (10) Patent No.: US 10,102,184 B1
(45) Date of Patent: Oct. 16, 2018

(54) ALLOWING OPERATING SYSTEM ACCESS TO NON-STANDARD FONTS IN A NETWORK DOCUMENT

(71) Applicant: Clantech, Inc., Draper, UT (US)

(72) Inventor: Robert G. Adamson, III, Draper, UT (US)

(73) Assignee: Clantech, Inc., Draper, UT (US)

( * ) Notice: Subject to any disclaimer, the term of this patent is extended or adjusted under 35 U.S.C. 154(b) by 0 days.

(21) Appl. No.: 15/582,399

(22) Filed: Apr. 28, 2017

Related U.S. Application Data (63) Continuation of application No. 15/197,389, filed on Jun. 29, 2016, which is a continuation of application No. 14/793,643, filed on Jul. 7, 2015, now Pat. No. 9,405,735, which is a continuation of application No. 13/956,265, filed on Jul. 31, 2013, now abandoned, which is a continuation of application No. 11/443,664, filed on May 30, 2006, now Pat. No. 8,522,127, which is a continuation of application No. 09/906,444, filed on Jul. 16, 2001, now abandoned.

(51) Int. Cl.
*G06F 17/00* (2006.01)
*G06F 17/21* (2006.01)
*G06F 17/22* (2006.01)
*G06F 8/61* (2018.01)

(52) U.S. Cl.
CPC .............. *G06F 17/214* (2013.01); *G06F 8/61* (2013.01); *G06F 17/2247* (2013.01)

(58) Field of Classification Search
CPC ..................................................... G06F 17/214
See application file for complete search history.

(56) References Cited

U.S. PATENT DOCUMENTS

| | | | |
|---|---|---|---|
| 4,594,674 A | | 6/1986 | Boulia et al. |
| 5,528,742 A | * | 6/1996 | Moore .................. G06F 3/1297 715/205 |

(Continued)

OTHER PUBLICATIONS

Dr. Dobb's True Type Font Secrets, Aug. 1, 1999, p. 1-7, available at URL: http://www.drdobbs.com/truetype-fontsecrets/184403680.

(Continued)

*Primary Examiner* — Amelia L Tapp
(74) *Attorney, Agent, or Firm* — TraskBritt (57) ABSTRACT

When a browsing computer navigates to a network document, such as a web page, the corresponding server also downloads computer readable formatting information necessary for the operating system of the browsing computer to render correctly any characters within the network document even if the fonts associated with those characters do not exist on the browsing computer prior to encountering the network document. An exposure module is also downloaded to the browsing computer. The exposure module is loaded onto the browsing computer, which in turn either permanently installs or temporarily exposes the operating system of the browsing computer to the computer readable font formatting information associated with the network document. As a result, the operating system of the browsing computer is able to display or otherwise process the network document correctly and consistently regardless of the computer readable fonts installed on the browsing computer.

6 Claims, 8 Drawing Sheets

(56) References Cited

U.S. PATENT DOCUMENTS

| | | | |
|---|---|---|---|
| 5,583,978 A | 12/1996 | Collins et al. | |
| 5,586,241 A * | 12/1996 | Bauermeister | G06F 17/214 345/170 |
| 5,689,724 A | 11/1997 | Morgan et al. | |
| 5,805,783 A | 9/1998 | Ellson et al. | |
| 5,871,714 A | 2/1999 | Budny | |
| 5,893,915 A | 4/1999 | Cordell et al. | |
| 6,012,071 A | 1/2000 | Krishna et al. | |
| 6,057,858 A | 5/2000 | Desrosiers | |
| 6,073,148 A | 6/2000 | Rowe et al. | |
| 6,189,018 B1 | 2/2001 | Newman et al. | |
| 6,271,865 B1 | 8/2001 | Yu et al. | |
| 6,278,449 B1 | 8/2001 | Sugiarto | |
| 6,320,587 B1 * | 11/2001 | Funyu | G06F 17/214 345/467 |
| 6,323,865 B1 | 11/2001 | Colletti | |
| 6,324,500 B1 | 11/2001 | Amro et al. | |
| 6,330,577 B1 | 12/2001 | Kim | |
| 6,449,639 B1 | 9/2002 | Blumberg | |
| 6,452,597 B1 * | 9/2002 | Goldberg | G09G 5/00 340/7.55 |
| 6,504,554 B1 | 1/2003 | Stone et al. | |
| 6,512,531 B1 | 1/2003 | Gartland | |
| 6,552,728 B1 | 4/2003 | Moore et al. | |
| 6,584,480 B1 | 6/2003 | Ferrel et al. | |
| 6,614,541 B1 | 9/2003 | Fritz et al. | |
| 6,665,842 B2 | 12/2003 | Nielsen | |
| 6,707,942 B1 | 3/2004 | Cortopassi et al. | |
| 6,718,540 B1 | 4/2004 | Azua et al. | |
| 6,760,887 B1 | 7/2004 | Taieb | |
| 6,834,048 B1 | 12/2004 | Cho et al. | |
| 6,853,980 B1 | 2/2005 | Ying | |
| 7,013,289 B2 | 3/2006 | Horn et al. | |
| 7,024,471 B2 | 4/2006 | George | |
| 7,194,624 B1 * | 3/2007 | Harris | H04L 9/00 380/243 |
| 7,210,099 B2 * | 4/2007 | Rohrabaugh | G06F 9/4443 455/518 |
| 2001/0054049 A1 | 12/2001 | Maeda et al. | |
| 2002/0107887 A1 | 8/2002 | Cousins | |

OTHER PUBLICATIONS

Turner, "Glyph Hell: An introduction to glyphs, as used and defined in the Free Type engine", version 1.0 (html version), Jan. 14, 1998, p. 1-16, available at http://www.physiol.med.tu-muenchen.de/-robert/freetype.html.

Dirk Eddelbuttel and William L. Goffe. 1999. Display and Interactive Languages for the Internet: HTML, PDF, and Java. Comput. Econ. 14, 1-2 (Oct. 1999), pp. 89-107.

PC Tools by Symantec, "Are You Missing Fonts from the Fonts Folder?" p. 1-2, retrieved from http://www.pctools.com/guides/registry/detail/278/ last modified Feb. 23, 1999. Last accessed Apr. 27, 2017.

* cited by examiner

ALLOWING OPERATING SYSTEM ACCESS TO NON-STANDARD FONTS IN A NETWORK DOCUMENT

CROSS-REFERENCE TO RELATED APPLICATIONS

This application is a continuation of U.S. patent application Ser. No. 15/197,389, filed Jun. 29, 2016, now U.S. Pat. No. 9,892,093, issued Feb. 13, 2018, which is a continuation of U.S. patent application Ser. No. 14/793,643, filed Jul. 7, 2015, now U.S. Pat. No. 9,405,735, issued Aug. 2, 2016, which is a continuation of U.S. patent application Ser. No. 13/956,265, filed Jul. 31, 2013, which is a continuation of U.S. patent application Ser. No. 11/443,664, filed May 30, 2006, now U.S. Pat. No. 8,522,127, issued Aug. 27, 2013, which is a continuation of U.S. patent application Ser. No. 09/906,444, filed Jul. 16, 2001, the disclosure of each of which is hereby incorporated herein in its entirety by this reference.

TECHNICAL FIELD

The present invention relates to the field of computer font technology. In particular, the present invention relates to methods, systems and computer program products for allowing characters of fonts that are not standard to an operating system of a computer to be displayed and/or otherwise used by the operating system of the computer.

BACKGROUND

Relevant Technology

Authors are in the business of conveying a message through the skillful and artistic use of characters often referred to as "text." In addition to the message read from the text, authors are often also concerned with the impression made by the visual appearance of the text. For example, a skilled author would not draft a technical document using the font style of a child's picture book as doing so would diminish the seriousness and professionalism of the work.

Recently, network sites, such as Internet web sites, have been made available as a new authoring medium. For example, an author using an authoring program loaded on a computer can write an electronic document, such as a web page. The authoring program may contain a number of unique or non-standard fonts that allow the author to create the electronic document so as to have a unique or desired appearance. In general, a font is simply a set of characters having a predefined typeface or configuration. Once created, the electronic document is stored on a server. A reader can then request and download the electronic document for display on the reader's computer.

Authors of conventional printed material can generally feel assured that, unless there is some damage to the printed material, the printed material will appear to the reader precisely as it was generated by the author. In contrast, electronic documents requested by a reader are displayed on the reader's computer using only the fonts that are currently loaded on the reader's computer. Accordingly, if the reader's computer does not contain the same fonts that were used by the author in creating the electronic document, the electronic document is displayed on the reader's computer in a form different than that originally created by the author. Generally, the operating system of the reader's computer replaces the unknown fonts with known fonts when displaying the electronic document.

Several attempts have been made to ensure that electronic documents made with non-standard fonts are displayed on a reader's computer in the same form, i.e., same font(s), as created by the author. One commonly used method is to represent the text as images in a digital format, such as bitmaps or jpeg files. These digital images, however, cannot be resized without a loss of quality. For example, if a digital picture of a text character is enlarged, the resolution of the text character is also enlarged, thereby degrading the visual appearance of the character both on the screen and in print.

Furthermore, characters represented as image files are typically much larger than characters represented by fonts. Accordingly, using an image file increases the size of the electronic document, thereby increasing its download time. In addition, image files take longer to display on a screen. Thus, operations such as scrolling that require an image to be frequently rendered are slowed down and otherwise degraded. Finally, characters represented as image files cannot be stylized. For example, such characters cannot be italicized.

In another attempted solution, a first computer includes a document builder that receives input text so that the input text may be represented in the document. The input text is originally defined using pre-defined font descriptions. The document builder then creates a new font description (hereinafter called a "proprietary vector font description") for the input text with the aid of a character shape recorder. The proprietary vector font description is then placed in the document. The first computer system then delivers the document to a second computer system.

The second computer system includes a character shape player which is uniquely configured to interpret the proprietary vector font descriptions included in the document. If the second computer system does not already have the character shape player, the character shape player may be downloaded with the document.

Although this latter solution improves upon the prior state of the art, the proprietary vector font description is not standard to a reader's operating system. Accordingly, this solution requires the use of the character shape player by every reader's computer that is to display an electronic document containing the proprietary vector font. Many applications may not be configured to access the services of the character shape player. Accordingly, this solution does not allow the fonts represented by the proprietary vector font description to be freely copied and pasted into or otherwise used, such as by printing, by other applications that do not access the services of the character shape player. In addition, even if an application had access to the object player mechanism, the fonts cannot be rendered as efficiently as they could if the operating system itself was capable of interpreting the fonts. Accordingly, operations such as scrolling of the fonts is sluggish.

Therefore, what are desired are methods, systems, and computer program products for allowing characters of fonts that are not standard to an operating system of a reader's computer to be conveniently used by the operating system to facilitate viewing, copying, pasting, printing, and/or editing of the characters in different applications.

BRIEF SUMMARY

The present invention extends to methods, systems, computer program products and data structures for allowing an operating system to have access to characters of non-standard fonts included in a network document. In one embodiment, a browser loaded on a computer navigates to a network document, such as a web page, that is hosted by a server. In an alternative embodiment, the network document can be any HTML document stored on any form of computer readable medium that can be opened by a browser. The network document contains characters that are defined by "non-standard fonts," i.e., fonts that are not loaded on the requesting computer and thus the corresponding characters cannot be displayed or otherwise used by the operating system thereof.

To enable the computer requesting or opening the network document to generate the characters defined by the non-standard fonts, a font package containing computer readable formatting information necessary for an operating system to render the corresponding characters is provided. The formatting information defines the configuration of each character for a corresponding font using standard font file formats such as a scaleable outline format. Installation software is also provided. The font package and installation software can be downloaded off of the server or otherwise loaded onto the computer.

The computer automatically executes the installation software which in turn either permanently installs or temporarily exposes the computer readable formatting information to the operating system so as to enable the operating system to render the characters of the non-standard fonts. As a result, the network document is generated and displayed by the computer using the same characters with which it was originally created.

Furthermore, in one embodiment the installation or exposure of the computer readable formatting information is done in a manner that the operating system of the computer has at least temporary access to utilize the characters of the nonstandard fonts. That is, the operating system is able to use the characters of the nonstandard fonts in the same way that it uses characters of original standard fonts. The operating system is thus able to efficiently copy, paste, print, modify, and otherwise edit the characters of the non-standard fonts.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The present invention extends to methods, systems, computer program products and data structures for allowing an operating system to have access to characters of non-standard fonts included in a network document. In one embodiment, a browser loaded on a computer navigates to a network document, such as a web page, that is hosted by a server. In an alternative embodiment, the network document can be any HTML document stored on any form of computer readable medium that can be opened by a browser. The network document contains characters that are defined by "non-standard fonts," i.e., fonts that are not loaded on the requesting computer and thus the corresponding characters cannot be displayed or otherwise used by the operating system thereof.

To enable the computer requesting or opening the network document to generate the characters defined by the non-standard fonts, a font package containing computer readable formatting information necessary for an operating system to render the corresponding characters is provided. The formatting information defines the configuration of each character for a corresponding font using standard font file formats such as a scaleable outline format. Installation software is also provided. The font package and installation software can be downloaded off of the server or otherwise loaded onto the computer.

The computer automatically executes the installation software which in turn either permanently installs or temporarily exposes the computer readable formatting information to the operating system so as to enable the operating system to render the characters of the non-standard fonts. As a result, the network document is generated and displayed by the computer using the same characters with which it was originally created.

Furthermore, in one embodiment the installation or exposure of the computer readable formatting information is done in a manner that the operating system of the computer has at least temporary access to utilize the characters of the nonstandard fonts. That is, the operating system is able to use the characters of the nonstandard fonts in the same way that it uses characters of original standard fonts. The operating system is thus able to efficiently copy, paste, print, modify, and otherwise edit the characters of the non-standard fonts.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
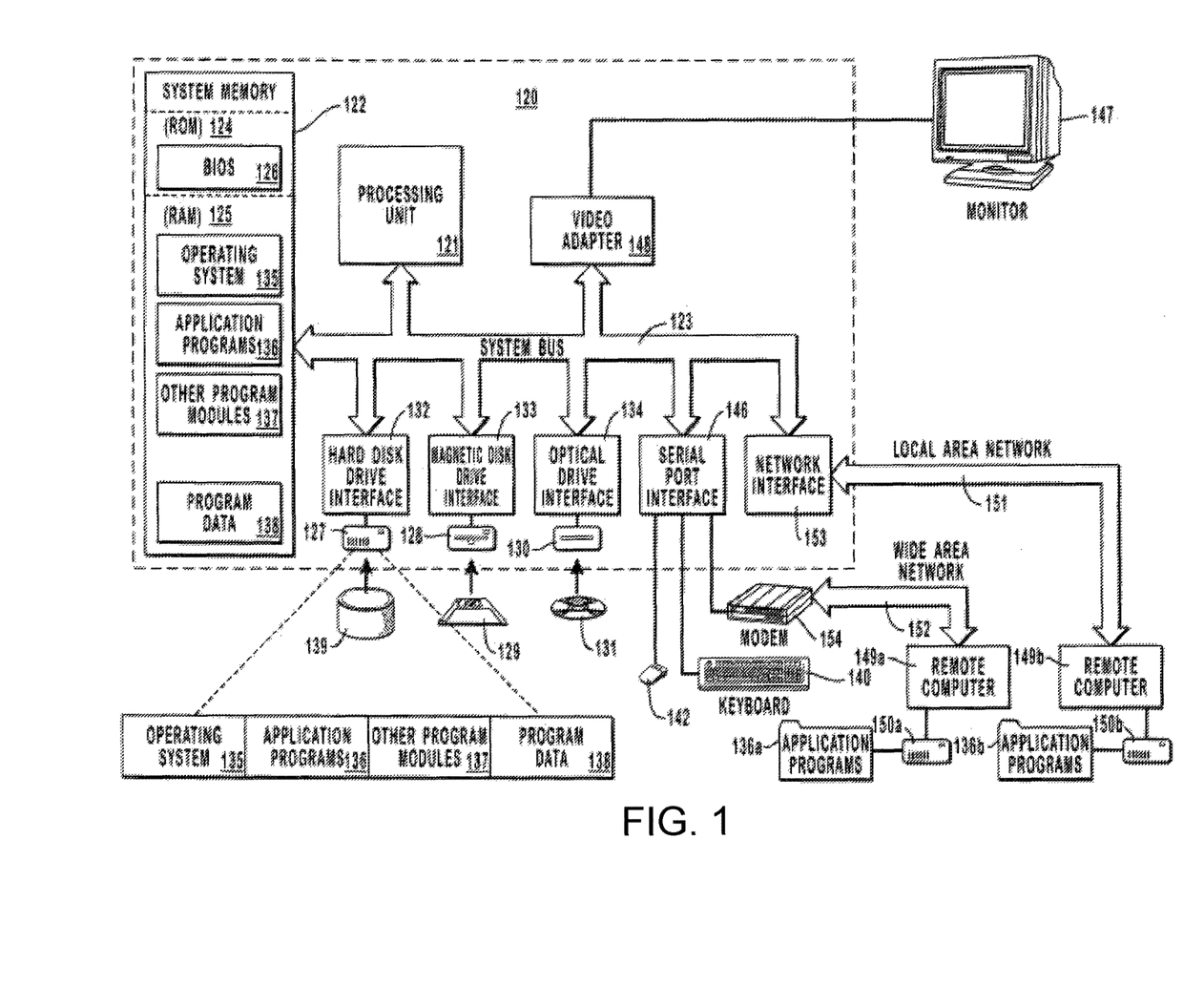
FIG. 1 is a schematic diagram of an example of a system that provides a suitable operating environment for the present invention.

FIG. 1 and the following discussion are intended to provide a brief, general description of a suitable computing environment in which the invention may be implemented. Although not required, one embodiment of the invention will be described in the general context of computer-executable instructions, such as program modules, being executed by computers in network environments. Generally, program modules include routines, programs, objects, components, data structures, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations. The term "computer" as used herein is broadly intended to include personal computers, hand-held devices such as personal information managers (PIMs), multi-processor systems, microprocessor-based or programmable consumer electronics, network PCs, minicomputers, mainframe computers, and the like. The term "computer" also includes distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, one example of a system for implementing the invention includes a general purpose computing device in the form of a conventional computer 120. Conventional computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

FIG. 1 is provided by way of illustration only. The principles of the present invention may be implemented in any operating environment that is able to implement the principles of the present invention. For example, given suitable software and/or adaptation, general-purpose computers, special-purpose computers or special purpose processing devices (whether now developed or to be developed in the future) might implement the principles of the present invention. In addition, the principles of the present invention may be implemented by software, hardware, firmware or any combination thereof.

Figure 2:
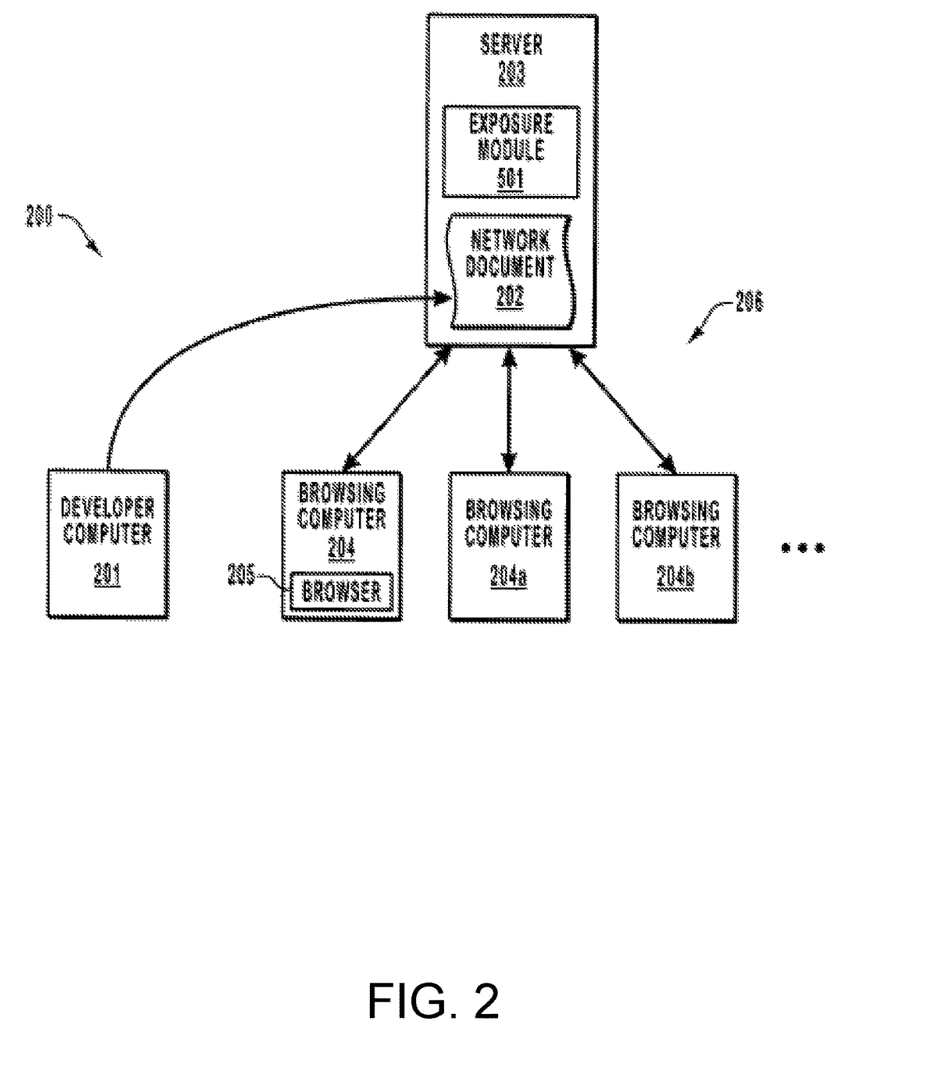
FIG. 2 is a schematic diagram of a network architecture in which a developer computer can post a network document, to a server for access by browsing computers.

FIG. 2 illustrates a typical network environment 200 in which one embodiment of the present invention is incorporated. Network environment 200 includes a developer computer 201 and a browsing computer 204. Browsing computer 204 is loaded with a network browser 205, such as MICORSOFT Internet Explorer or NETS CAPE NAVIGATOR, and is selectively coupled in electrical communication with a network 206. Network 206 can comprise one or more LANs such as LAN 151 and/or one or more WAN s such as WAN 152 as described with FIG. 1. In the embodiment depicted, network 206 includes a server 203. Server 203 can comprise a conventional Internet server or any other type or combination of computers as previously discussed herein. Browser 205 is configured to enable browsing computer 204 to access and communicate with server 203.

As used herein, the term "developer computer" and "browsing computer" is each intended to include "computers" as previously defined herein. One example of developer computer 201 and browsing computer 204 is computer 120 as discussed with regard to FIG. 1. In one embodiment as depicted in FIG. 2, one or more additional browsing computers 204a-b can also be electrically coupled with network 206. Likewise, although not required, developer computer 201 can also be electrically coupled with network 206 through a network browser.

Developer computer 201 is used to create a network document 202. Network document 202 is shown as being hosted or stored on server 203. As used herein, the term "network document" is intended to mean any form of an electronic file that can have a display character embedded therein, attached thereto, referenced therein, such as through a link, or can otherwise be associated therewith.

The term "character" as used herein is intended to mean any discrete letter, number, symbol, design, mark, sign, figure, text, or the like that is currently known or created in the future. With regard to computer code, a "character" also includes a bit value qualified by a corresponding font or default font. For example, as an HTML document, such as a web page, is created, the text which is to be displayed during normal viewing is typed in and bounded on each side by a specific font tag. The font tag defines the name of the font, such as Times New Roman or Courier. The computer reads each of the characters of the text as a numerical bit value. As an operating system processes the HTML document, the operating system read the font tag and determines whether a font file corresponding to the font tag is loaded in the standard font directory. Each font file includes the formatting information necessary for the operating system to render each character of the font.

If the font file corresponding to the font tag is loaded in the standard font directory, the operating system determines the bit value of each character and then renders each character by matching the bit value to the formatting information in the corresponding font file. Accordingly, although the letter "A" may always have the same bit value, its configuration can be changed by simply associating it with different font tags. Accordingly, in one embodiment computer executable instructions identifying a display character includes the bit value for a character and the font or default font qualifying the bit value.

The term "display character" as used herein means the characters of a network document which are intended to be or can selectively be displayed during normal viewing of the network document. "Display characters" are in contrast to computer executable instructions or source code comments.

The term "non-standard character" is intended to mean display characters of a network document for which the corresponding formatting information is not loaded on or otherwise available to a browsing computer for rendering the character prior to requesting or otherwise receiving the network document. It is appreciated that the determination of whether a character qualifies as a non-standard character is based solely upon what formatting information is loaded upon or otherwise available to a discrete browsing computer. As different browsing computers may have different fonts and corresponding formatting information available thereon, a list of non-standard characters for a discrete network document can change between different browsing computers even if the network document remains the same.

Furthermore, as used herein, a "font" defines one or a group of characters each having a defined configuration. There are thousands of different known fonts. Examples of conventional letter fonts include the characters associated with Times New Roman, Arial, and Courier. Examples of conventional symbol fonts found on MICROSOFT Word 2000 include the characters associated with Symbol, Tahoma, and WP Math A. Furthermore, just as an infinite number of different characters can be created, it is appreciated that an infinite number of unique and different fonts can be created.

By way of example and not by limitation, "network documents" can include web pages and other forms of electronic files that can be posted on the Internet; email communications including those that have an HTML document attached thereto; and an HTML document that has embedded therein or reference to any form of application file that contains a display character. Examples of such application files include text files, WORDPERFECT files, power point presentation files, and other special application files.

Figure 3A:
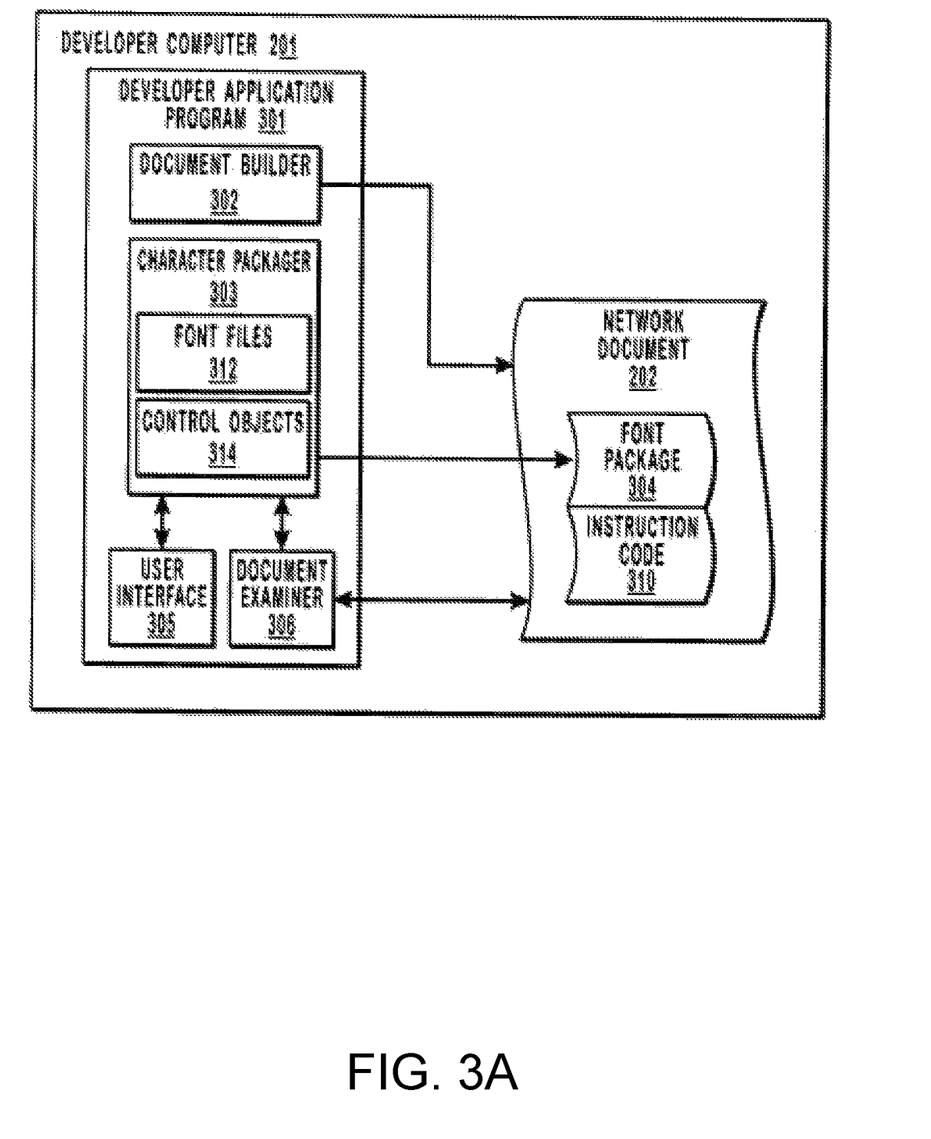
FIG. 3A is a schematic diagram of an architecture that may be used to develop the network document as shown in FIG. 2 containing non-standard characters so as to facilitate delivery of the non-standard characters to the browsing computers.

FIG. 3A illustrates one embodiment of developer computer 201 of FIG. 2 having a developer application program 301 loaded thereon. In one embodiment, developer application program 301 includes a document builder 302 that allows an author to generate network document 202. For example, document builder 302 can be any type of existing program, such as MICROSFT FRONTPAGE or MICROSOFT Word, or a specially written program which is capable of forming an HTML document.

Developer application program 301 also includes a character packager 303. One function of character packager 303 is to generate a font package 304 that is incorporated into or linked to network document 202. As discussed below in greater detail, font package 304 includes the formatting information necessary for the operating system of browsing computer 204 to generate one or more display characters, generally non-standard characters, when browsing computer 204 downloads and displays network document 202.

That is, as previously discussed, one of the problems of the prior art is that an increasing number of electronic documents are being created using unique characters wherein corresponding formatting information is not loaded on or otherwise available to a browsing computer, i.e., non-standard characters. Accordingly, when a browsing computer downloads the electronic document over a network or otherwise receives and opens the electronic document, the electronic document is displayed on the browsing computer without the non-standard characters or by replacing the non-standard characters with other characters that are available to the browsing computer. In any event, the electronic document is displayed in a format different from that intended at its creation.

In part, character packager 303 identifies the display characters used in network document 202 that are to be included in font package 304. Character packager 303 is a program that can be written in C++ or other languages and may run as either a standard desktop application or within a web browser via its own plugin technology. The identification of the display characters can be accomplished in a variety of different ways. By way of example and not by limitation, in one embodiment a user interface 305 allows the author or another to identify specific characters, groups of characters, or entire fonts that are to be included within font package 304. For example, character packager 303 can enable manual input, manual highlighting, manual selection from a table, and/or other form of manual selection of the specific characters, groups of characters, and/or fonts which are to be included in font package 304. This selection of characters can be accomplished either before, during, or after the creation of network document 202.

In general, the characters and/or groups which are selected include those characters which the individual making the selection believes the corresponding formatting information is most likely not loaded on or otherwise available to browsing computer 204 which will ultimately display network document 202. In one embodiment, rather than selecting specific characters that are actually used on network document 202, character groups and/or fonts can be selected even if all of the characters of a group or font are not used within network document 202. In yet another embodiment, all fonts where at least one character thereof is used within network document 202 can be selected for inclusion into font package 304.

Alternatively or in addition to user interface 305, a document examiner 306 can be used. Document examiner 306 examines network document 202 and, based on preestablished parameters, automatically selects characters, character groups, and/or fonts for incorporation into font package 304. For example, in one embodiment document examiner 306 can contain a list of characters, character groups, and/or fonts (hereinafter, "character list"), selected from the entire inventory of characters and fonts available for use by document builder 302 in the creation of document 202, which are considered likely to be non-standard characters to browsing computer 204. For example, the character list may correspond to those characters or fonts which are not standard to WINDOWS 2000 or some other predefined operating system.

Simultaneously with or subsequent to the creation of network document 202, document examiner 306 searches network document 202 and identifies all characters within document 202 that are found on the character list. The identified characters are then incorporated into character packager 303. Alternatively, document examiner 306 can search electronic document 202 and identify all of the fonts used therein that are located on the character list. The identified fonts are then incorporated into character packager 303. It is appreciated that there are a variety of different ways in which document examiner 306 can select the characters or fonts. For example, document examiner 306 can also include a list of standard characters and/or fonts and then review network document 202 to identify those characters and/or fonts that are not on the standard list.

As the different characters, character groups, and/or fonts are selected by user interface 305 and/or document examiner 306, character packager 303 creates corresponding font files 312. Each font file 312 has a font name and corresponds to a defined character, group of characters, or entire font. Specifically, each font file 312 includes all of the computer readable formatting information necessary for a computer operating system to render each of the characters associated with the corresponding font file 312. Although the amount of formatting information can vary, the type of formatting information is generally the same as that for standard fonts. For example, the formatting information is sufficient to enable display, printing, copying, pasting, and other conventional forms of manipulation such as bolding, underlining, strikeout, and the like.

The formatting information can be in any standard font file format. In one embodiment, the formatting information is in a scaleable outline form such as TRUETYPE. Examples of other formats include raster and stroke. It is appreciated that meta files can also be used.

Although each font file 312 can include formatting information for only one character, more often, each font file 312 includes information on a group of characters or a complete font. For example, document examiner 306 can be used to select all characters of a given font used within network document 202. This group of characters, which is typically less than the entire font, is assigned to a specific font file 312. The file is typically given a name other than the conventional font name so that the sub-set of the font does not accidentally replace the complete font which may already be loaded on a browsing computer.

Character packager 303 also creates a discrete control object 314 for each corresponding font file 312. Contained within each control object 314 is select handling information which can be used to selectively enhance, manipulate, or otherwise alter the characters within the corresponding font file 312. By way of example and not by limitation, the handling information can facilitate stretching, twisting, looping, unique shadowing, or any other manipulation of characters that is not standard to an operating system. For example, the handling information generally does not include the information necessary for bolding, underlining, strikeout, italicizing, outlining, and the like.

Once font files 312 and control objects 314 are completed, character packager 303 combines and compresses font files 312 and control objects 314 so as to form font package 304.

Figure 4:
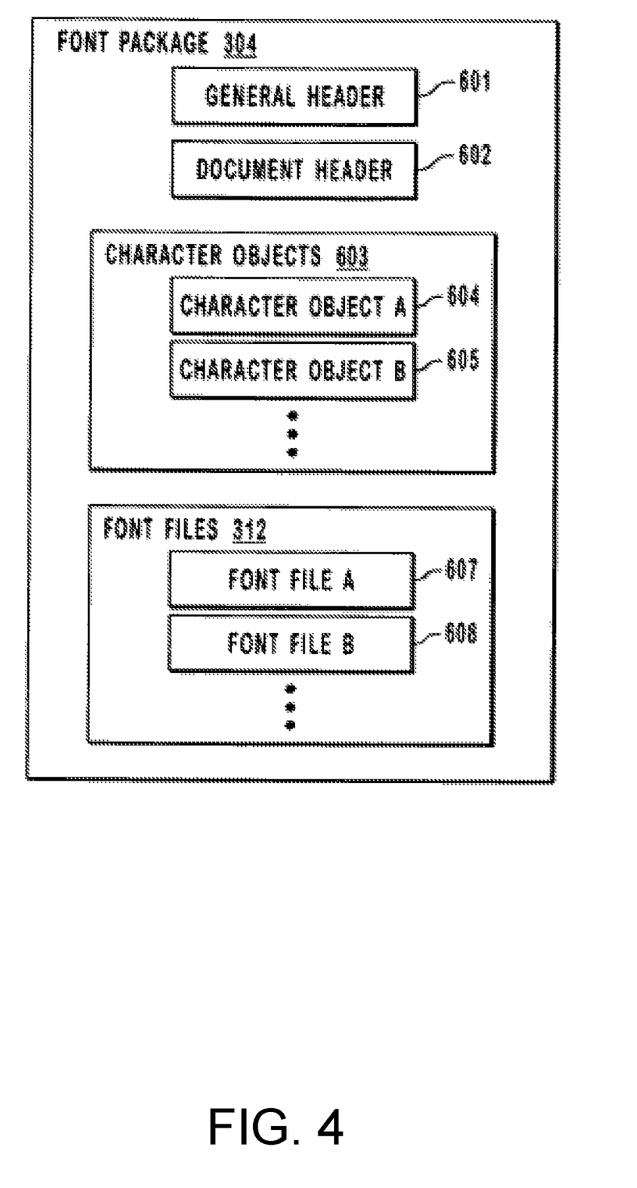
FIG. 4 illustrates an example of a data structure that may be used to deliver the non-standard characters to the browsing computers.

FIG. 4 illustrates one embodiment of a data structure for font package 304. As shown therein, font package 304 includes a general header 601 that contains general information about font package 304 in an uncompressed state. A document header 602 is in a compressed state and includes general document and version information.

The discrete font files 312 are also located within font package 304 in a compressed state. For each font file 312 has a corresponding character object 603. Character objects 603 are substantially the same as control objects 314 in that each character object 603 includes the handling information for the characters of the corresponding font file 312. Unlike control objects 314, however, character objects 603 specifically reference the corresponding font file 312 so as to facilitate handling of the characters.

For example, character objects 603 include one or more character objects such as character object A (labeled 604) and character object B (labeled 605). Each character object references and describes handling and version information for a corresponding font file of font files 312. For example, character object A references and describes corresponding handling and version information for font file A (labeled 607), and character object B references and describes corresponding handling and version information for font file B (labeled 608).

In one embodiment, character packager 303 can also encrypt font package 304. It is appreciated that the data structure of font package 304 can have a variety of different configurations and that the files therein need not be compressed. Furthermore, in one embodiment, control objects 314 and character objects 603 can be eliminated. That is, where it is only desired to generate the characters as opposed to the additional handling thereof, font package 304 can be created with only font files 312.

Once font package 304 has been generated, it is assigned an extension such as, for example, ".TRZ." In one embodiment, font package 304 is imbedded directly within network document 202. Alternatively, font package 304 can be stored in a different directory than network document 202 at server 203 and can also be stored at a different server. In this latter case, network document 202 references font package 304 using a corresponding tag. Accordingly, when network document 202 is downloaded to browsing computer 204, font package 304 is also downloaded. In this description and in the claims, a file being "referenced" in a document means that downloading the document also causes downloading of the file such as through corresponding tags, such as embedded tags or object tags, or other computer executable instructions.

In addition to the creation of font package 304, character packager 303 also creates instruction code 310, depicted in FIG. 3A, that is either referenced by or embedded within network document 202. Instruction code 310 comprises computer executable instructions that facilitate downloading onto browsing computer 204 an installation module 501. As discussed below, installation module 501 is loaded onto server 203 (FIG. 2) and comprises computer-executable instructions for automatically installing font package 304 on browsing computer 204 when browsing computer 204 requests network document 202. In one embodiment, installation module 501 comprises an ACTIVEX® control. Instruction code 310, in one embodiment, comprises a Multipurpose Internet Mail Extension (MIME) type which corresponds to the extension of the font package (e.g., ".TRZ"). The file name and relative path of installation module 501 are identified in instruction code 310 within a tag that indicates to the browser that installation module 501 is to be downloaded. In this regard, network document 202 references installation module 501 for downloading with network document 202.

As depicted in FIG. 2, once font package 304 and instruction code 310 have been included in network document 202, network document 202 is loaded onto server 203 so as to accessible by browser computer 204 over network 206. As mentioned above, also loaded onto server 203 is installation module 501.

Figure 3B:
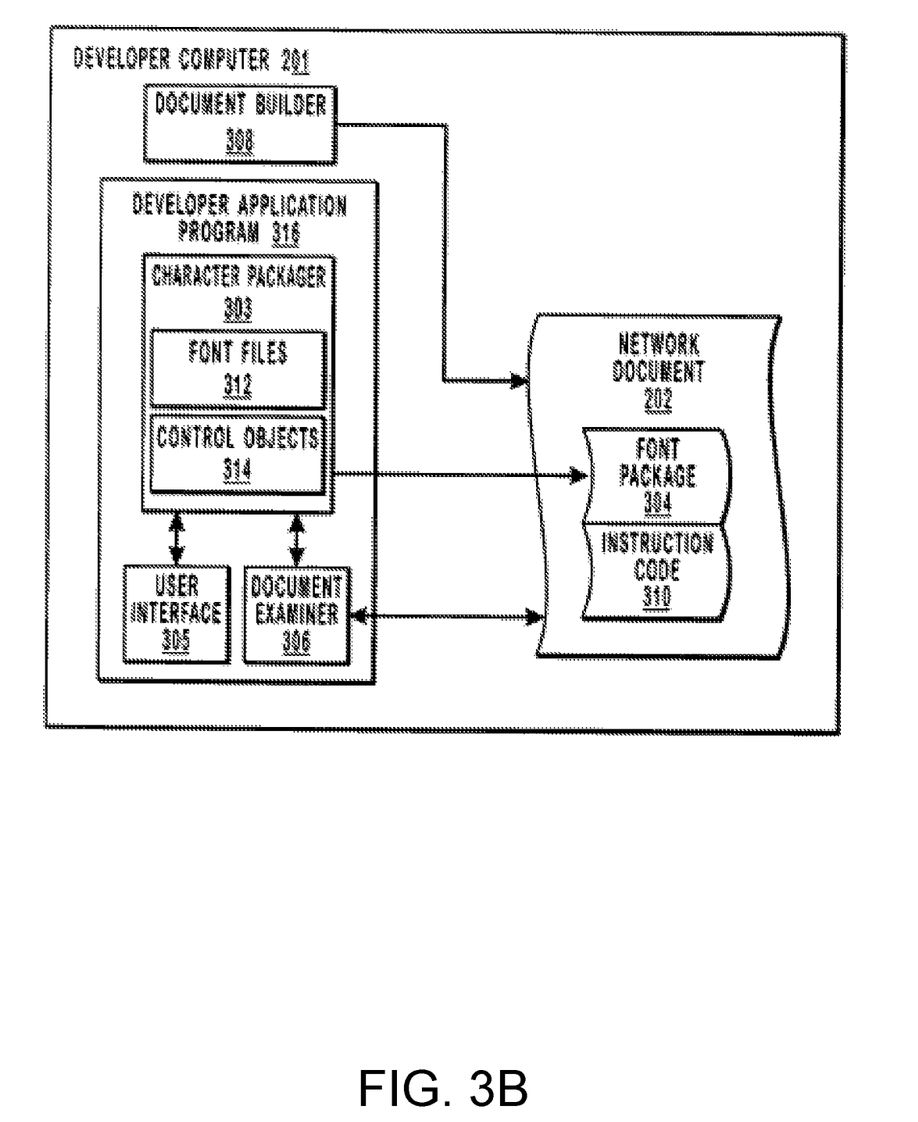
FIG. 3B is a schematic diagram of an alternative design of the architecture shown in FIG. 3A.

In contrast to the system depicted in FIG. 3A, it is appreciated that document builder 302 need not be included in developer application program 301. This is because it is not necessary that character packaging occur concurrently with the building of network document 202. For example, as depicted in FIG. 3B, network document 202 is generated using a conventional document builder 308 that is completely separate from a developer application program 316. Examples of document builder 308 include all standard and specially designed applications used for creating HTML documents. Once network document 202 is created, character packager 303 of developer application program 316 creates font package 304 as previously discussed above with regard to FIG. 3A. In yet another embodiment, network document 202 can be created on a separate computer and then loaded onto developer computer 201 where developer application program 316 is applied thereto.

Figure 5:
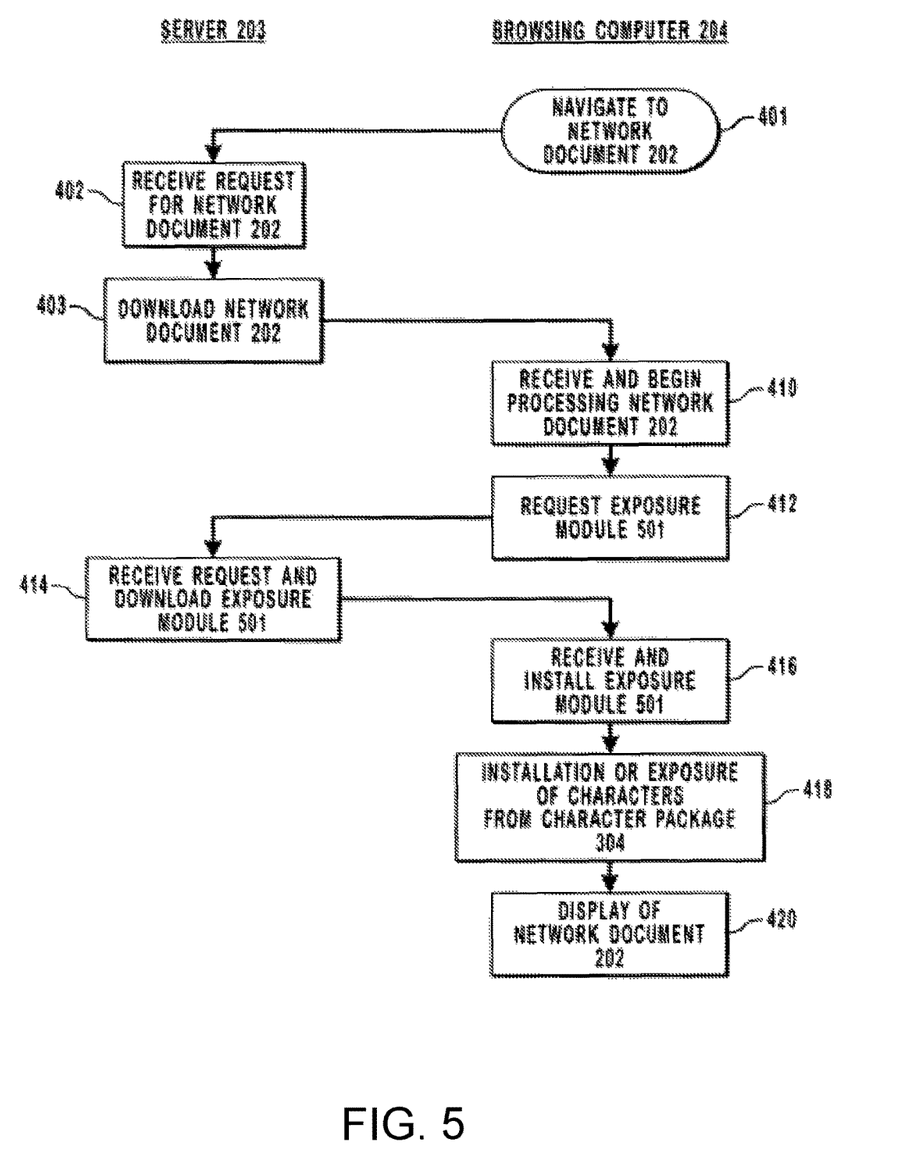
FIG. 5 is a flowchart showing one method of operation of the present invention.

Depicted in FIG. 5 is a flow chart showing the method of operation between browsing computer 204 and server 203. Actions performed primarily by server 203 are listed in the left column while actions performed primarily by browsing computer 204 are listed in the right column. In an act 401, browsing computer 401 navigates to network document 202 by generating a request for network document 202 and communicating the request to server 203 in accordance with a transport protocol such as, for example, HyperText Transport Protocol (HTTP). In general, browsing computer 204 navigates to network document 202 by either typing in the URL for network document 202 or activating a link thereto.

In act 402, server 203 receives the request for network document 202. In response to this request, server 203 downloads network document 202 to browsing computer 204 (act 403). Network document 202 includes either directly or indirectly, such as through a reference, instruction code 310 and font package 304. As such, instruction code 310 and font package 304 are downloaded with network document 202.

In act 410, browsing computer 204 receives and begins processing the computer executable instructions within network document 202. In act 412, browsing computer 204 processes instruction code 310 and requests installation module 501. The request for installation module 501 can be automatic which automation can include a prompt. Server 203, in act 414, receives the request and downloads installation module 501 to browsing computer 204. In turn, in act 416, installation module 501 is installed on browsing computer 204, such as an extension to one or more browsers. Again, the installation of installation module 501 can be automatic which automation can include a prompt. In turn, installation module 501 automatically makes font package 304 available to the operating system of browsing computer 204.

Figure 6:
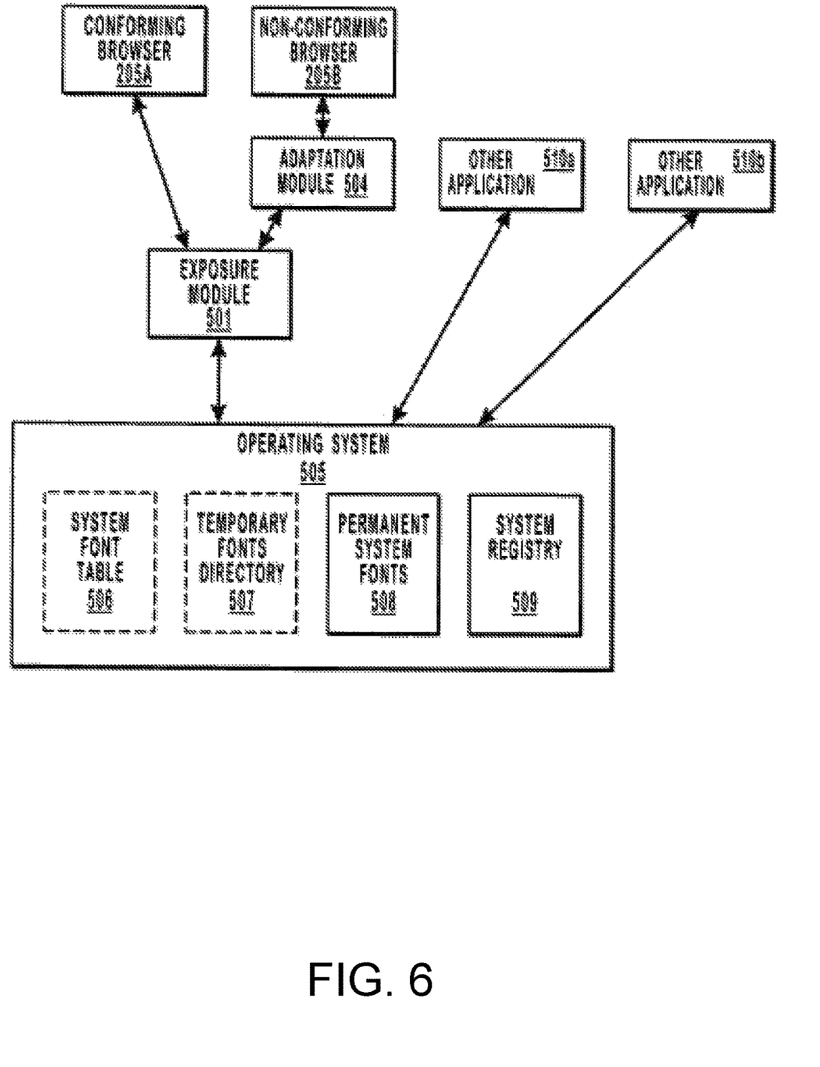
FIG. 6 is a schematic diagram of an installation module operating between a browser and an operating system.

FIG. 6 illustrates installation module 501 and surrounding elements that are emulated when computer-executable instructions are executed by the processor associated with browsing computer 204. Once downloaded, installation module 501 communicates with a conforming browser 205A of browsing computer 204 via, for example, function calls and returns. Conforming browser 205A represents browsers that are able to communicate with installation module 501 without an intermediary module. For example, MICROSOFT Internet Explorer may communicate directly with an ACTIVEX® control without a plug in.

Installation module 501 also may communicate with non-conforming browser 205B of browsing computer 204. Non-conforming browser 205B represents browsers that are not able to communicate with installation module 501 without an intermediate module. Accordingly, installation module 501 communicates with nonconforming browser 205B via an intermediary adaptation module 504. For example, if installation module 501 is an ACTIVEX control, some browsers such as NETSCAPE may not communicate directly with installation module 501. In this case, adaptation module 504 may be, for example, a plug-in for NETSCAPE that translates function calls and returns. Thus, the present invention may be implemented with a wide variety of browsers.

It is appreciated that adaptation module 504 can be selectively downloaded from server 203 with installation module 501 based on the type of browser (conforming or non-confirming) requesting installation module 501. Alternatively, adaptation module 504 can be incorporated into installation module 501 and thus always downloaded but only accessed when needed.

Browsers 205A and/or 205B can also determine whether installation module 501 has been previously downloaded to browsing computer 204. If so, redundant downloading of installation module 501 may be avoided In addition, the MIME type used in requesting installation module 501 can also identify the desired version for installation module 501. The browser can thus check the previously installed installation module 501 and if old, download the new version. With Internet Explorer, the version checking can be done by checking the HTML CODEBASE version specified. In NETSCAPE NAVIGATOR a special JAVASCRIPT code can be used to check the version number.

As depicted in FIG. 6, once installed, installation module 501 also communicates with operating system 505 of browser computer 204, thereby accessing all the wealth of resource offered by the operating system 505.

As depicted in FIGS. 5 and 6, in act 418, to enable operating system 505 to access the formatting information within font package 304 the formatting information thereof is either permanently installed on or temporarily exposed to operating system 505. Initially, as part of the installation process, installation module 501 first decompresses, if previously compressed, and deciphers, if previously encrypted, character objects 603 and font files 312 along with the header information contained within font package 304. Once decompressed and deciphered, character objects 603 and font files 312 are automatically either permanently installed on or temporarily exposed to operating system 505 by installation module 501. Temporary exposure may occur, for example, when it is desired to limit the use or life of the non-standard characters. Permanent installation can be used to allow perpetual unrestricted use of the non-standard characters.

To facilitate permanent installation, character objects 603 and corresponding referenced font files 312 are copied into the same directory as the other standard or permanent system fonts 508. For example, permanent system fonts are typically stored in a system fonts directory. The system registry 509 is then updated to reflect the addition of the new permanent character objects 603 and corresponding font files 312.

To facilitate temporary exposure, character objects 603 and font files 312 are copied into a temporary fonts directory 507. Temporary fonts directory 507 may be located so as not to be directly accessible by a user. For example, character objects 603 and font files 312 can be copied into hidden temporary files. Virtual memory mapped files are used to enable operating systems 505 to access the hidden temporary files. Alternatively, character objects 603 and font files 312 can also be copied to virtual memory files. Once temporary fonts directory 507 is created, system font table 506 is updated to reflect the new temporary font files 312. In one embodiment, the installed font files 312 are enumerated in a virtual memory array to ensure that any existing fonts with the same name are not replaced.

Once installed or exposed, all of the currently running applications may be notified of new font files 312 via, for example, a standard WM_FONTCHANGE message with HWND_BROADCAST as the target message. Server 203 may be notified of the successful installation of character objects 603 and font files 312 via a callback to a JAVASCRIPT® function provided in HTML document 202. In NETS CAPE NAVIGATOR, this notification may be accomplished via LIVE CONNECT®. In Internet Explorer this notification may be accomplished via an ACTIVEX® Component Object Model (COM).

Temporary fonts directory 507, which contains character objects 603 and font files 312, can be removed or at least become inaccessible through a variety of different mechanisms. For example, installation module 501 can be programmed to automatically delete character objects 603 and font files 312 via a JAVASCRIPT® control when the browser is turned off or when any other predefined act is performed, such as closing network document 202 or requesting another web page. Furthermore, due to the volatile nature of hidden temporary files and virtual memory mapped files, these files are either erased or become inaccessible to operating system 505 once browsing computer 204 is shut down or rebooted.

In act 420 of FIG. 5, once font files 312 are enabled on browsing computer 204, operating system 505 uses font files 312 to generate the display of network document 202 in the same form that it was originally created. One of the unique benefits of the present invention is that once font files 312 are enabled on browsing computer 204, the characters within font files 312 can be used the same as any of the font characters originally loaded on browsing computer 204. For example, the characters of font files 312 can be cut, pasted, printed and otherwise handled or manipulated, i.e., underlined, italicized, bolded, etc., just the same as originally loaded font characters. In turn, this increases efficient inter-application functionality. For example, the characters of font files 312 can also be copied and pasted to any other application being control by operating system 505, for example, applications 510a or 510b as depicted in FIG. 6.

Figure 7:
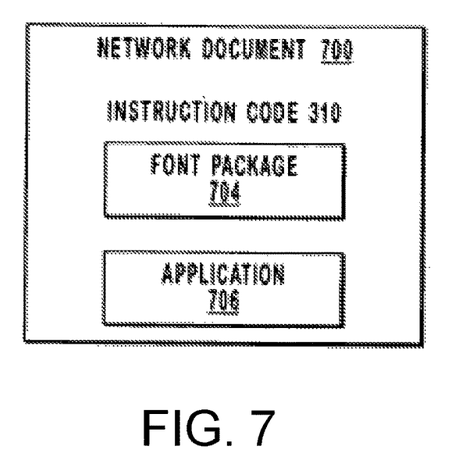
FIG. 7 is a schematic diagram of an HTML network document incorporating features of the present invention.

The above described method is only one embodiment of the application of the present invention. By way of example and not by limitation, depicted in FIG. 7 is a network document 700 which is in HTML. Network document 700 can be posted on a server, attached to an e-mail, recorded on a computer disk or CD, or recorded on any other type of computer readable media which can be requested by or transferred to browsing computer 204 for opening by browser 205.

Embedded within network document 700 or included by a linked reference is an application 706. Application 706 can comprise any type of application program, application file, plugin, or ACTIVEX that generates or includes one or more display characters. Also embedded within network document 700 or included by a linked reference is a font package 704. Font package 704 includes one or more font files which contain the formatting information necessary for the creation of the non-standard display characters of application 706. If desired, character objects containing handling information can also be incorporated into font package 704. In this embodiment, font package 704 may be created completely independent of application 706.

In substantially the same manner as discussed above with regard to FIG. 5, as browser 205 opens and begins processing network document 700, instruction code 310 embedded therein requests installation module 501 which is downloaded by server 203. In turn, installation module 501 either permanently installs or temporarily exposes the font files of font package 704 on browsing computer 204. Accordingly, as application 706 is opened or run so as to generate the display characters thereof, the non-standard display characters are displayed in their intended configuration.

Figure 8:
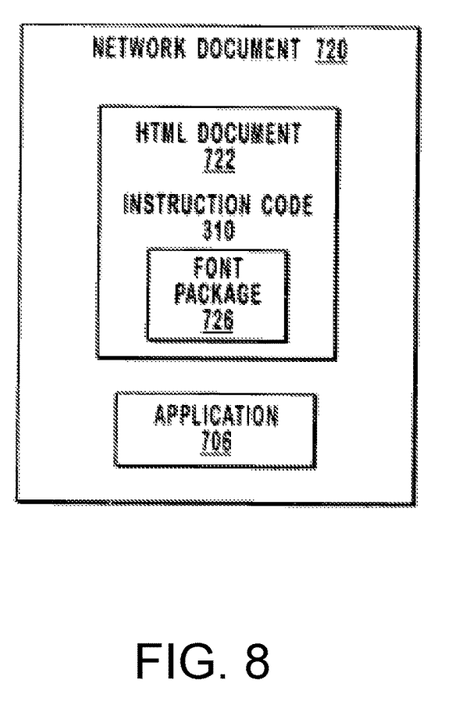
FIG. 8 is a schematic diagram of an email based network document incorporating features of the present invention.

In yet another embodiment, as depicted in FIG. 8, a network document 720 comprises an email. Typed directly on the email can be one or more display characters. Alternatively or in combination therewith, an application 730 can be attached to network document 720. Application 730 can comprise any type of application program or file that generates or includes one or more display characters.

Also attached to network document 720 is an HTML document 722. Embedded within HTML document 722 or included by reference is a font package 726. Font package 726 includes one or more font files which contain the formatting information necessary for the creation of the non-standard display characters typed on the email and/or which are to be generated or included in application 730.

During use, network document 720 is emailed to browsing computer 204 and opened thereon. In turn, HTML document 722 is selected and then opened by browser 205. As above, as browser 205 processes HTML document 722, instruction code 310 embedded therein requests installation module 501 which is downloaded by server 203. In turn, installation module 501 either permanently installs or temporarily exposes the font files of font package 726 on browsing computer 204. In turn, the nonstandard characters typed on the email body portion of network document 720 can be appropriately displayed. Furthermore, as application 706 is opened or run so as to generate display characters, the non-standard display characters can be displayed in their intended configuration.

The present invention also envisions that an HTML document containing a font package and instruction code 310 can also be delivered to browsing computer 204 completely separate from an HTML document, application program, or application file that contains corresponding non-standard display characters. That is, once font files are permanently installed or temporarily exposed on browsing computer 204, an HTML document, application program, or application file that was either previously or subsequently loaded can be run or opened. The non-standard display character generated by the document, program, or file can then be appropriately displayed as a result of the loaded font files.

Thus, the principles of the present invention allow the operating system of a browsing computer access to non-standard characters when the browsing computer either retrieves off of the Internet or otherwise opens a network document or application that uses the non-standard characters. This allows the author of the electronic document or application to feel secure that no matter how unique the characters chosen to convey a message, the characters will be rendered on the browsing computer as the author intended. In addition, in one embodiment, the operating system can now use the nonstandard characters for copying and pasting across applications, as well as any other editing or printing that is enabled by the operating system, thus enhancing the functionality to the end user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A handheld device, comprising:
    a display;
    a processing unit;
    a system memory;
    a wireless communication connection;
    an operating system stored in the system memory, wherein the operating system comprises a network document browser; and
    a network document that was transmitted to the handheld device from a server using the wireless communication connection,
    wherein the network document is stored in the system memory, and
    wherein the network document comprises:
    a font file embedded in the network document containing formatting information for the handheld device to render a plurality of display characters on the display using the formatting information, wherein the formatting information includes scalable outline formatting information;
    a first application file embedded in the network document that includes computer executable instructions identifying a plurality of display characters to be rendered using the scalable outline formatting information in the font file; and
    an installation module embedded in the network document that was transmitted to the handheld device from the server, wherein the installation module comprises:
        computer executable instructions for communicating with the network document browser to expose at least a portion of the installation module to the network document browser; and
    within the at least a portion of the installation module, computer executable instructions for automatically exposing the font file to the operating system of the handheld device, and enabling the network document browser to detect and render the plurality of display characters on the display using the formatting information and standard font handling tools of the operating system.

2. The device of claim 1, wherein after transmission of the network document to the handheld device by the server, no further communication with the server is made to enable the network document browser to render the plurality of display characters on the display between execution of the instructions in the installation module and the network document browser rendering the plurality of display characters on the display using the font file.

3. The device of claim 2, wherein the formatting information relates to a font that is not included in the operating system as a standard font.

4. The device of claim 3, wherein at least a portion of the formatting information is encrypted.

5. The device of claim 4, wherein the first application file contains HTML instructions.

6. The device of claim 5, wherein the font file contains formatting information for only a sub-set of all characters of the font.

* * * * *

UNITED STATES PATENT AND TRADEMARK OFFICE
CERTIFICATE OF CORRECTION

PATENT NO. : 10,102,184 B1  
APPLICATION NO. : 15/582399  
DATED : October 16, 2018  
INVENTOR(S) : Robert G. Adamson, III Page 1 of 1

It is certified that error appears in the above-identified patent and that said Letters Patent is hereby corrected as shown below:

On the Title Page  
In ITEM (63) Related U.S. Application Data, Line 2:  change "Jun. 29, 2016, which" to --Jun. 29, 2016, now Pat. No. 9,892,093, which--

Signed and Sealed this  
Fourth Day of December, 2018

Andrei Iancu  
*Director of the United States Patent and Trademark Office*